(12) United States Patent
Delaney

(10) Patent No.: US 7,611,154 B2
(45) Date of Patent: Nov. 3, 2009

(54) PNEUMATIC VEHICLE STABILIZATION SYSTEM

(75) Inventor: Patrick M. Delaney, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 283 days.

(21) Appl. No.: 11/329,427

(22) Filed: Jan. 11, 2006

(65) Prior Publication Data

US 2007/0158920 A1   Jul. 12, 2007

(51) Int. Cl.
*B60K 25/00* (2006.01)
*B60G 17/00* (2006.01)
*B60G 11/26* (2006.01)

(52) U.S. Cl. .................. 280/6.15; 180/53.1; 280/6.153; 280/6.154; 280/6.157; 280/124.157

(58) Field of Classification Search ................. 180/53.1, 180/53.4; 182/63.1–69.6; 267/64.16, 64.28; 280/5.514, 6.151, 6.153, 6.154–6.156, 6.157–6.159
See application file for complete search history.

(56) References Cited

U.S. PATENT DOCUMENTS

| | | | | | |
|---|---|---|---|---|---|
| 2,787,343 | A | * | 4/1957 | Mitchell | 182/15 |
| 2,915,137 | A | * | 12/1959 | Troche | 182/2.9 |
| 3,100,025 | A | * | 8/1963 | Shennum | 182/2.9 |
| 3,173,511 | A | * | 3/1965 | Verrell et al. | 182/2.11 |
| 3,595,597 | A | | 7/1971 | Wenham | |
| 3,603,611 | A | | 9/1971 | Wenham | |
| 3,666,286 | A | | 5/1972 | Engfer | |
| 3,893,540 | A | * | 7/1975 | Beucher | 182/2.9 |
| 4,088,200 | A | * | 5/1978 | Cowley et al. | 182/2.11 |
| 4,094,381 | A | * | 6/1978 | Wilkerson | 182/66.1 |
| 4,282,794 | A | * | 8/1981 | Miller et al. | 89/36.15 |
| 4,296,833 | A | * | 10/1981 | Ashworth | 182/2.9 |
| 4,335,901 | A | | 6/1982 | Gladish | |
| 4,391,452 | A | | 7/1983 | Ohmori | |
| 4,429,763 | A | * | 2/1984 | Houck | 182/2.9 |
| 4,433,849 | A | | 2/1984 | Ohmori | |
| 4,453,725 | A | | 6/1984 | Kuwana et al. | |
| 4,466,625 | A | | 8/1984 | Kondo et al. | |
| 4,483,546 | A | | 11/1984 | Brearley | |
| 4,834,215 | A | * | 5/1989 | Smeal | 182/66.2 |
| 5,540,203 | A | * | 7/1996 | Foulkes et al. | 123/446 |

(Continued)

FOREIGN PATENT DOCUMENTS

GB     2186100 A  *  8/1987

OTHER PUBLICATIONS

International Search Report and Written Report from Serial No. PCT/US06/61964.

*Primary Examiner*—Paul N Dickson
*Assistant Examiner*—Laura Freedman
(74) *Attorney, Agent, or Firm*—Jeffrey P. Calfa; Mark C. Bach

(57) ABSTRACT

An electronic height control system for a vehicle chassis air suspension is modified to provide bimodal operation. In the second mode of operation the chassis air suspension system is maintain a stationary in a stable, level position to serve as a base for a mobile aerial lift unit installed on the vehicle. Operation of the suspension system in its stabilization and leveling mode is triggered by activation of a vehicle power take-off unit ("PTO") used to position the aerial lift unit.

10 Claims, 3 Drawing Sheets

U.S. PATENT DOCUMENTS

| | | | |
|---|---|---|---|
| 5,639,119 A * | 6/1997 | Plate et al. | 280/754 |
| 5,971,493 A * | 10/1999 | Robert | 298/17 S |
| 5,988,654 A * | 11/1999 | Wix et al. | 280/6.15 |
| 6,431,557 B1 * | 8/2002 | Terborn et al. | 280/6.15 |
| 7,261,304 B2 * | 8/2007 | Trudeau et al. | 280/6.153 |
| 2003/0047892 A1 * | 3/2003 | Goddard | 280/5.514 |
| 2005/0161891 A1 * | 7/2005 | Trudeau et al. | 280/5.507 |
| 2005/0275184 A1 * | 12/2005 | Lamela et al. | 280/124.157 |

* cited by examiner

PNEUMATIC VEHICLE STABILIZATION SYSTEM

BACKGROUND OF THE INVENTION

1. Technical Field

The invention relates to motor vehicle suspension systems and more particularly to a suspension system for motor vehicles which carry and support positionable loads such as aerial lift units.

2. Description of the Problem

Aerial lift units, used for accessing equipment mounted on utility poles or for tree trimming, are conventionally mounted on medium duty trucks. The truck provides a base for the aerial lift unit, and is subjected to differing rotational moments as the aerial lift unit is extended and positioned. Off center loads on the vehicle suspension obviously tend to cause the vehicle to tip to one side or to lean forward or backwards. To stabilize vehicles either outriggers have been used or the vehicles have been equipped with torsion bars. Outriggers are in effect struts which extend outwardly from the vehicle into contact with the ground to stabilize the vehicle. Outriggers though require side to side clearance which may or may not be available. The general alternative is to stiffen the vehicle's suspension with torsion bars. The torsion bars are oversized and vehicles so equipped require large amounts of ballast (up to 4500 lbs) to stabilize the chassis and allow movement of the aerial lift. Torsion bar stabilizing systems are very stiff. Some newer torsion bar designs use both front and rear stabilizing bars. With such suspension systems ride and comfort of the driver are sacrificed in the service of providing a base for the aerial lift unit. Torsion bar systems are preferred many times because the vehicles must operate in tight locations that don't allow outriggers to be deployed. A second advantage of a torsion bar system is the operators do not have to worry about putting the outriggers down before using the aerial device. Torsion bars also tend to lift wheels on the opposite side of the vehicle from the direction of deployment of the aerial lift. This is, up to a point, an advantage. With the wheels lifted, the spring suspension for those wheels does not continue pushing the vehicle in the direction in which the vehicle is leaning. While torsion bar systems offer some unique design solutions they bring with them some real trade-offs. A torsion bar chassis may be unable to level the chassis at the job site; ANSI regulations require that the chassis be level to within 5 degrees before use. This means that in some situations, when the operator cannot position the chassis within the 5-degree allowance, he must call in an aerial device with outriggers or perform the work in an unsafe condition.

Contemporary vehicles used to support aerial lift units that provide stabilization without outriggers use torsion bar systems. The ballast required by these systems is heavy and the torsion bars are expensive and dramatically affect the drivability of the vehicle. The torsion bars are up to three inches in diameter and can be difficult to install. The large quantities of ballast required dramatically reduce the carrying capacity and fuel economy of the chassis.

SUMMARY OF THE INVENTION

According to the invention an electronic height control system for a vehicle chassis air suspension is modified to provide a second mode of operation. In the second mode of operation a stationary vehicle equipped with such a suspension system provides a stable, level platform as a base for a mobile aerial lift unit carried by the vehicle. Operation of the suspension system in its stabilization and leveling mode is triggered by activation of a vehicle power take-off ("PTO") facilities used to position the aerial lift unit. The bimodal suspension control system utilizes cooperation between a vehicle electrical system controller ("ESC"), an electronic hydraulic control module which controls a hydraulic system providing positioning of the aerial lift unit, a suspension control module ("SCM") for a vehicle air suspension system and one or more data links, such as one provided by a controller area network (CAN), which directly or indirectly link the three control modules. The suspension control module gains an input from a two axis (biaxial) chassis level sensor while retaining inputs from suspension height measurement sensors (spring extension/compression measurement). An auxiliary switch package used for control of PTO operation is typically connected to the ESC by a secondary, low baud rate datalink.

Air spring based suspension systems have been advantageously equipped with height control systems which individually vary the air pressure in the springs or air bladders to keep the extension of the springs equal to one another notwithstanding changes in or shifts of the vehicle's load. Height control though does not level the vehicle when the vehicle is stopped on uneven ground. Level control in the second mode of operation is based on readings from a biaxial level sensor mounted to the chassis. Response to this input may be limited by inputs from the extension measurement sensors but level control does not operate to make spring extension equal unless the vehicle is on level ground. The chassis is leveled automatically every time the aerial device is used. When the operator arrives at the job site and activates a PTO enable switch, the chassis is first leveled with the unit still stowed to provide the best possible stability. When the mobile aerial lift unit is in operation the system functions in a manner analogous to torsion bar stabilization, adjusting the axle loading to optimize stability. The electrical system controller coupled with a controller area network interlinking control modules provides integration of chassis suspension, and ESC provides additional safety interlocks for the operator. When the work conditions are out of the safe five-degree allowable grade, the system does not work or operates only in a de-rated safe zone. This system ties together the chassis suspension control with the ESC, user inputs, level sensor outputs and hydraulic controls.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
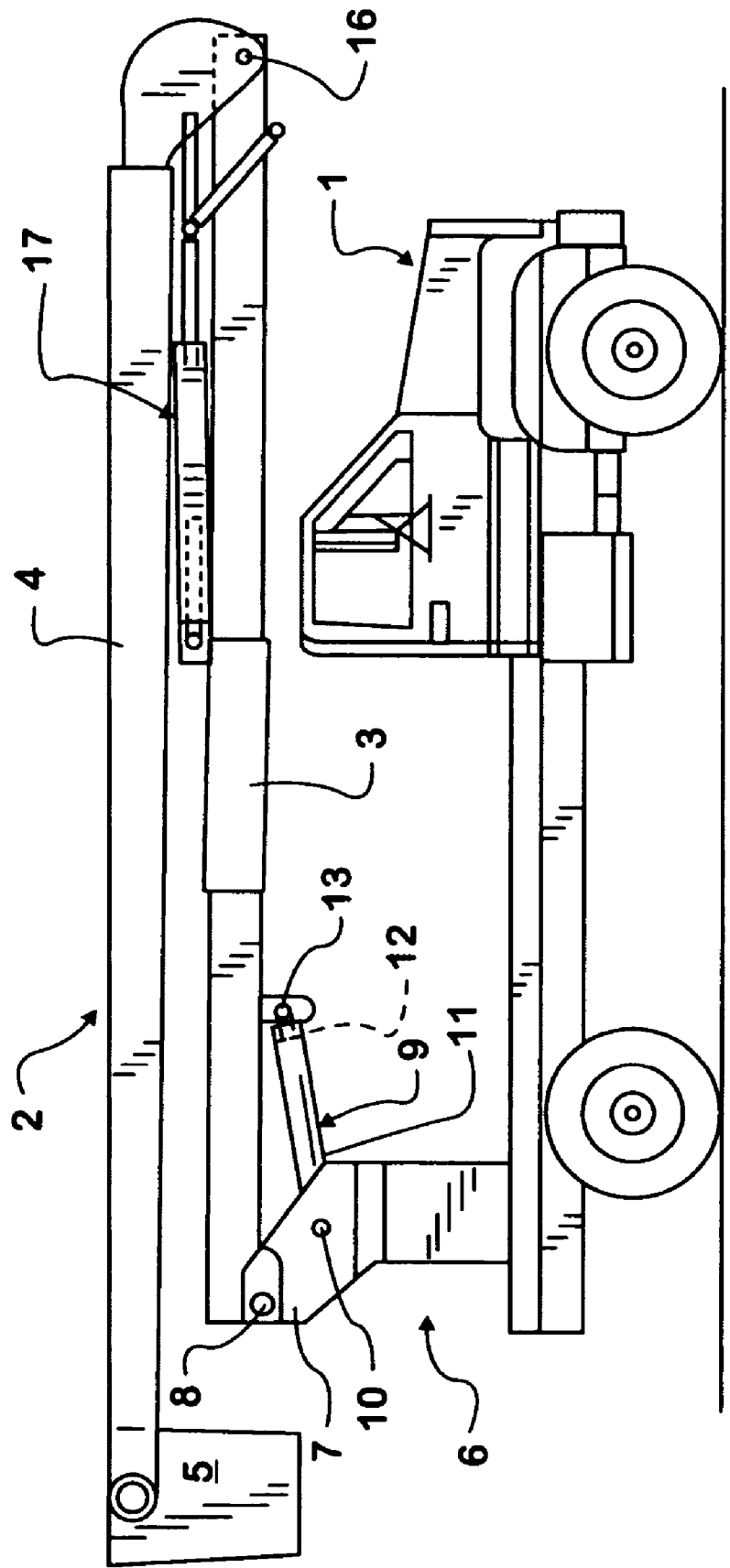
FIG. 1 is a simplified illustration of a truck mounted aerial lift assembly for locating an operator in various raised positions.

Referring to the drawings, and particularly to FIG. 1, an example of a mobile aerial lift unit is illustrated in simplified presentation for clarity of illustration. The mobile aerial lift apparatus includes a truck 1 with an aerial lift unit 2 mounted to the bed thereof. The aerial lift unit 2 includes a lower boom 3 and an upper boom 4 pivotally interconnected to each other and to the truck bed through support 6 and rotatable support bracket 7. A basket 5 is shown secured to the outer end of the upper boom 4 within which the operating personnel are located during the lifting to and locating within a selected work area in accordance with known practice. Basket 5 is typically pivotally attached to the out end of the boom 4 to maintain a horizontal (level) orientation at all times. The aerial lift unit is mounted to the truck bed through support 6. A rotatable support bracket 7 is secured to the support 6 and projects upwardly. The lower boom 3 is pivotally connected as at pivot 8, to the rotatable support bracket 7. A lifting lower boom cylinder unit 9 is interconnected between bracket 7 and the lower boom 3. In the illustrated embodiment, a pivot connection 10 connects the lower boom cylinder 11 of unit 9 to the bracket 7. A cylinder rod 12 extends from the cylinder 11 and is pivotally connected to the boom 3 through a pivot 13. The cylinder units are connected to supplies of a suitable pressurized hydraulic fluid, to lift and lower the assembly as desired. The rotatable support bracket is rotated using pressurized hydraulic fluid as well.

The outer end of the lower boom 3 is interconnected to the lower and pivot end of the upper boom 4. A pivot 16 interconnects the outer end of the lower boom 3 to the pivot end of upper boom. An upper boom/compensating cylinder unit or assembly 17 is connected between the lower boom 3 and the upper boom for pivoting the upper boom about pivot 16 for positioning of the upper boom relative to the lower boom. The upper boom/compensating cylinder unit 17 is constructed to permit independent movement of the upper boom 4 relative to lower boom 3 and to provide a compensating motion between the booms to maintain the upper boom raising with the lower boom and is similarly connected to the sources of pressurized hydraulic fluid. Conventionally, aerial lift unit 2 requires positive hydraulic pressure to support operation of lower boom cylinder 11 or the upper boom cylinder 17 for lifting or lowering. The hydraulic positioning system for aerial lift unit 2 is a conventional hydraulic power take off system providing raising, lowering and rotation. Its actuation is controlled by valves which in turn are electronically controlled.

Upon extension and positioning of the aerial lift boom 2 the suspension system for truck 1 can subject the vehicle to destabilizing loads. In addition, truck 1 may have to be parked at a location which is not level. The present invention provides an alternative control scheme for a height control suspension system to provide chassis leveling and which can operate to prevent operation of the aerial lift unit if the vehicle is positioned and oriented on ground that is excessively sloped, or when a selected position could destabilize the truck 1.

Figure 2:
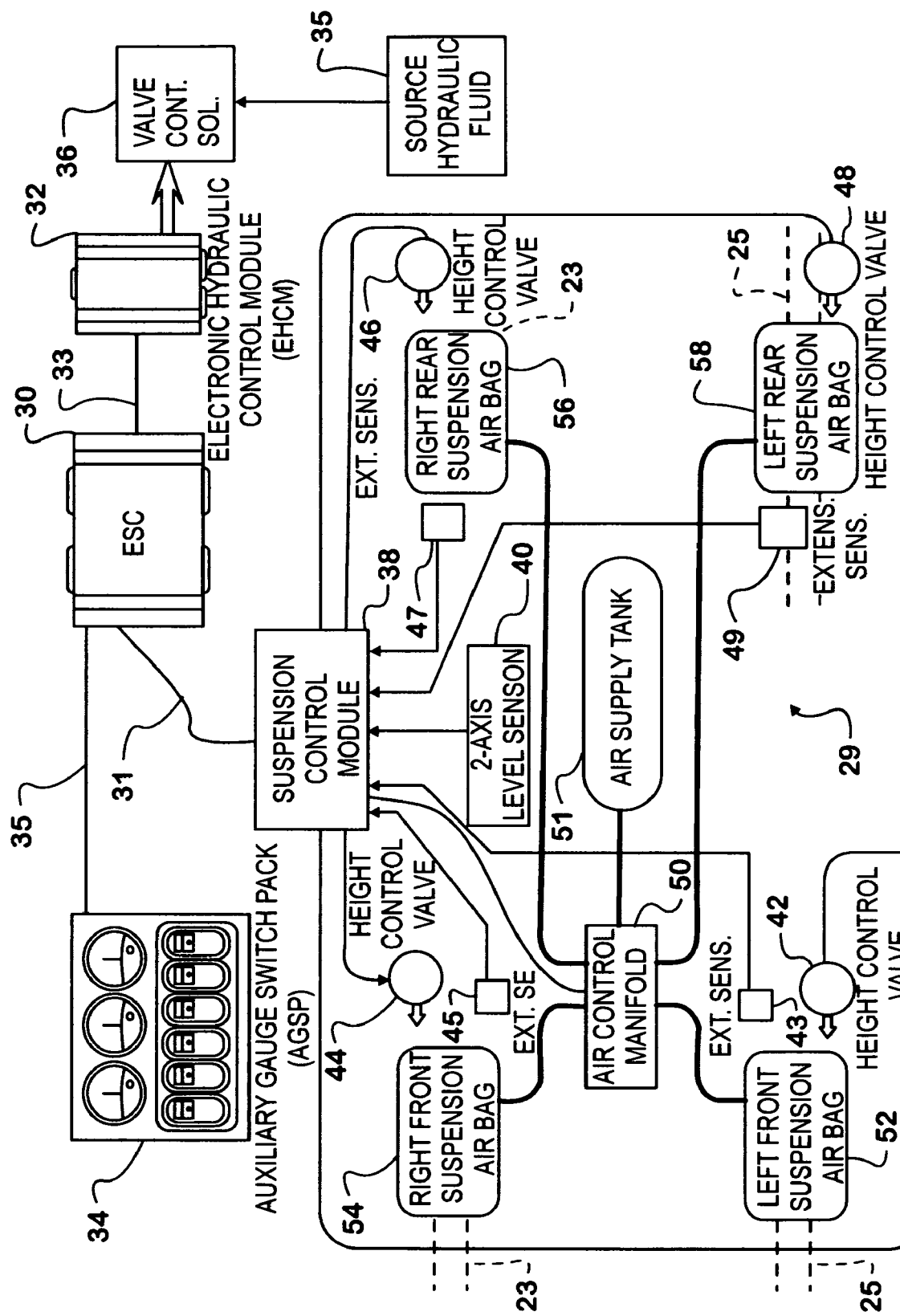
FIG. 2 is a high level schematic of a vehicle suspension system providing height control.

Referring to FIG. 2, a high level schematic of a suspension control system 29 providing bimodal chassis leveling is illustrated. An electrical system controller 30 is a body computer and is linked by a datalink 31 to a suspension control module 38 which controls pressure in the air bags 52, 54, 56, 58 to maintain vehicle height or to level the vehicle depending on the operational mode selected. Right front and rear suspension air bags 54, 56 support the vehicle at points under right side chassis frame rail 23. Left front and rear air bags 52, 58 support the vehicle at points under left side frame rail 25. Datalink 31 is preferably part of a public controller area network (CAN) conforming to the SAE J1939 standard. Electrical system controller 30 is also linked to an auxiliary gauge switch pack ("AGSP") 34 by a datalink 35. It is possible that datalinks 31, 35 operate on the same CAN, but more typically datalink 35 will be a lower speed datalink conforming to the SAE J1708 standard. Electrical system controller 30 further communicates with a PTO controller such as an electronic hydraulic control module (EHCM) 32 over datalink 33. Datalinks 33, 31 may coexist on the public CAN or datalink 33 may exist on a private CAN. Where the datalinks occur on physically separate busses, the electrical system controller 30 is readily programmed to pass messages appearing on one datalink to another datalink.

Air spring suspension systems conventionally utilize valves admitting compressed air to the air bags and exhaust valves discharging air from the air bags to adjust the pressure in air bags installed between vehicle wheels and the vehicle chassis. Overall suspension spring rates can be adjusted to compensate for vehicle load and air spring pressure can be adjusted location by location to compensate for changes in a vehicle's load. In the conventional control regime, the pressure in individual air springs is adjusted to keep the air springs at a constant extension, equal to the extension of the other springs. In the present patent this is termed "driving suspension" mode.

An air spring suspension system 29 for a vehicle 1 equipped with a mobile aerial unit 2 is illustrated as having four air springs including a left front suspension air bag 52, a right front suspension air bag 54, a right rear suspension air bag 56 and a left rear suspension air bag 58. The flow of compressed air to each of left front suspension air bag 52, a right front suspension air bag 54, a right rear suspension air bag 56 and a left rear suspension air bag 58 from air supply tank 51 is regulated by an air flow control manifold 50. The release of air from each of left front suspension air bag 52, right front suspension air bag 54, right rear suspension air bag 56 and left rear suspension air bag 58 is controlled by height control valves 42, 44, 46 and 48, respectively. The air flow control manifold 50 and the height control valves 42, 44, 46 and 48 are all under the control of a suspension control module 38. In driving suspension mode control by the suspension control module is responsive to four air bag extension sensors 43, 45, 47 and 49, which are associated with left front suspension air bag 52, a right front suspension air bag 54, a right rear suspension air bag 56 and a left rear suspension air bag 58, respectively. Driving suspension mode provides maintaining pressures in each of left front suspension air bag 52, right front suspension air bag 54, right rear suspension air bag 56 and left rear suspension air bag 58 such that the vehicle is kept at a constant, predetermined height above the ground at all four corners. In other words each of the springs is kept at a constant average extension, ignoring temporary variation due to road noise and cornering. Although such systems are often called "self-leveling" suspensions, they do not level the chassis in an absolute sense, but rather even it. Thus the suspension supports the vehicle at equal heights above the ground at the four points of support. Such a control scheme does not provide a "level" chassis in an absolute sense unless the vehicle is on level ground. Right and left side frame rails 23, 25 (shown in phantom) represent the chassis or spring section of truck 1.

Suspension control module 38 shifts to chassis leveling mode in response to indication from the electrical system controller 30, or possibly direct indication, that a power take-off controller 32 has been engaged. A necessary condition for power take-off operation is that a PTO engagement switch has been activated on the auxiliary gauge switch pack 34 as registered by the ESC 30 over datalink 35. Other conditions may be required before ESC 30 indicates that PTO operation has been requested, e.g. that the transmission be in park (or out of gear) and that a park brake be set (not shown). Failure of any of these other conditions may cancel PTO operation. But for purposes of this discussion, the narrow sense may be taken as operative where only engagement of the PTO switch is strictly required. Upon indication that PTO operation has been requested the suspension control module 38 provisionally enters chassis leveling mode. The inputs from extension sensors 43, 45, 47 and 49 become subsidiary to a 2-axis level sensor 40 mounted on the chassis. The measurements from extension sensors 43, 45, 47 and 49 may remain of secondary interest for indicating approach to out of limits operation or for indicating an attempt to operate the aerial lift unit with the vehicle on excessively sloping terrain. However, suspension control module 38 operates primarily in response to the indications of 2-axis level sensor 40 that vehicle 1 is not level. Equalization in the extension (or compression) of left front suspension air bag 52, right front suspension air bag 54, right rear suspension air bag 56 or left rear suspension air bag 58, relative to one another is no longer a criteria, although it may be desirable to keep the average extension close to the usual norm for all of the springs and to limit extension/compression of air bags 52, 54, 56, 58 to maximum/minimum limits. Where the chassis, or spring section of the vehicle cannot be leveled, with aerial lift unit 2 stowed, ESC 30 can cancel PTO operation.

If the vehicle's sprung section can be leveled, chassis leveling is no longer provisional and PTO operation is engaged. Upon extension of aerial lift unit 2 to one side of the vehicle it should be clear that the suspension on the same side of the vehicle will tend to be compressed under the off center load. Suspension control system 38 will direct air to the suspension air bags on the same side of the vehicle to keep the vehicle level. Suspension control system 38 also releases air from air bags on the opposite side from the side to which the aerial lift unit 2 is positioned to keep the average extension of all four air bags 52, 54, 56, 58 close to the usual norm and to reduce the amount of force generated by the air springs located on the side of the vehicle distal to the direction of extension to the aerial lift unit.

Continued leveling of the vehicle chassis (in the absolute sense relative to the earth's gravitational field) occurs in response to events. It will be recognized that aerial lift unit 2 is periodically repositioned. Operation of the aerial lift unit 2 occurs in response to user inputs through, for example through auxiliary gauge switch pack 34 and is effected through operation of hydraulic control solenoids 36 by EHCM 32. These events are reported by the EHCM 32 to ESC 30 and in turn to the suspension control module 38, triggering releveling of the vehicle chassis based on output of the 2-axis level sensor 40. Suspension control module 38 recognizes that limits to leveling are reached when extension sensors 43, 45, 47 and 49 indicate that the corresponding air bags have reached the limits of their operation. When such limits are reached the suspension control module 38 indicates such to the electrical system controller 30 which can in turn impose limits on the freedom of operation for the EHCM 32. It should be recognized that the limits for extension of hydraulic lifts cannot be predetermined without foreknowledge of the slope on which the vehicle is to be used. Obviously the limits for extension of the aerial lift will change depending upon the horizontal direction in which the unit is aimed. Indeed ESC 30 may require retraction of the aerial lift unit 2 if an attempt to rotate the unit is made after extension. ESC 30 indicates limits to the EHCM 32 disabling movement in certain directions, or further extension of the aerial lift, as possibilities. Alternatively retraction of the aerial lift 2 concurrent with movement may be required at the expense of added software complexity.

Figure 3:
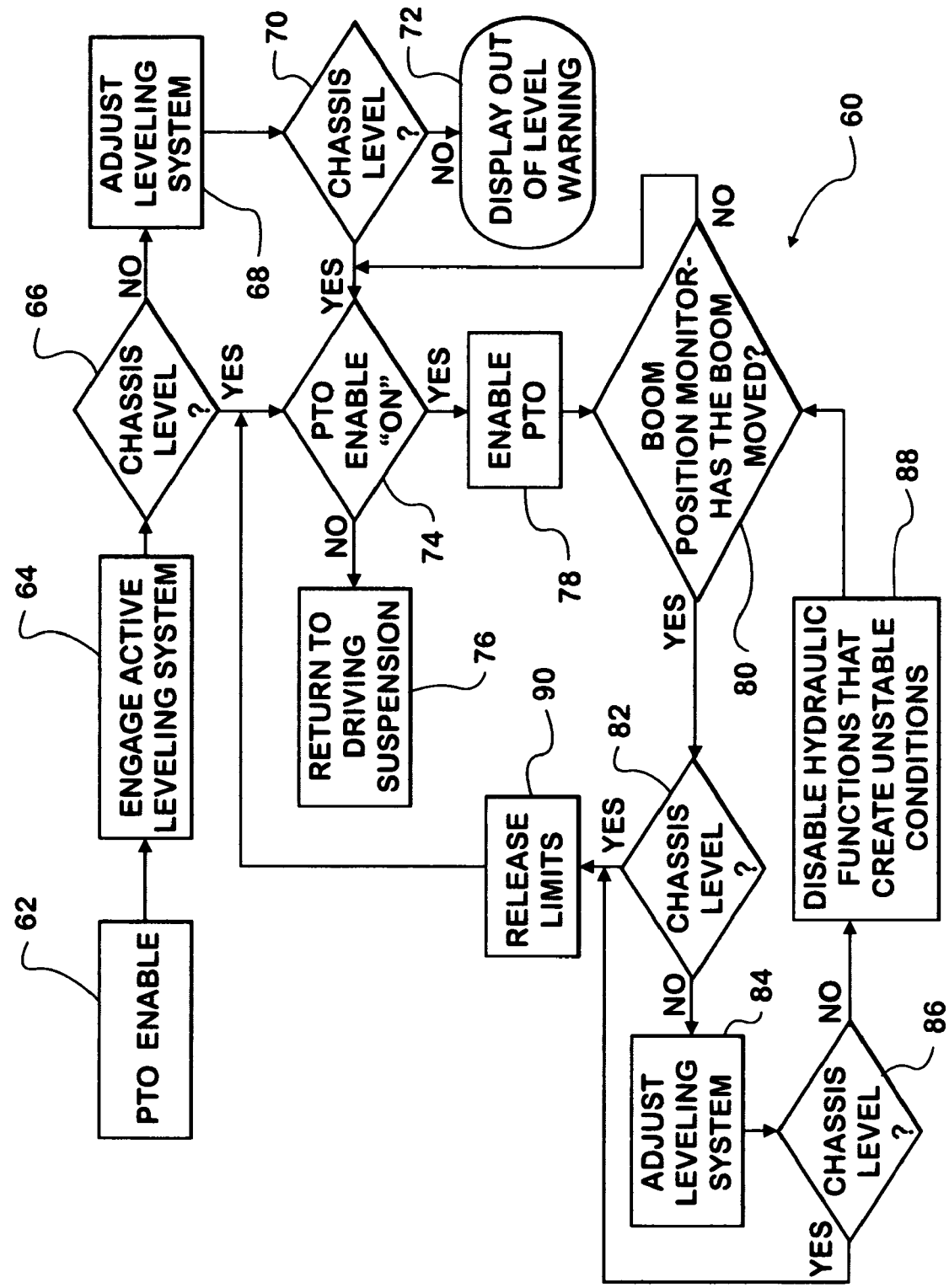
FIG. 3 is a flow chart illustrating a program for utilizing the vehicle height control system for leveling and stabilization.

FIG. 3 is a flow chart illustrating at a high level, operation of the leveling mode for a suspension control system. Upon PTO enable (step 62) the leveling mode is entered as indicated by engagement of the active leveling system (step 64). At step 66 it is determined from readings taken from the 2-directional level sensor 40 whether the chassis is level. If not, suspension control module 38 adjusts air pressure in the air bags until the chassis is level or a limit is reached with respect to one of the air bags. This is indicated at step 70 as a query relating to whether the system has been able to level the chassis (to within 5% limits). If not, then step 72 is executed indicating an out of level warning. If the system is functioning properly this warning essentially indicates that the ground is not level enough to allow operation of the aerial lift. Although it is conceivable that aerial lift unit 2 could be extended safely in a particular direction (for example in a direction opposite to the down slope of a hill) even though the vehicle is initially too far out of level, the program does not at this time contemplate determination as to whether such extension could be safely made. Instead PTO operation is not enabled and suspension control is returned to driving suspension mode.

If at step 70 it was determined that the chassis was leveled, then operation is advanced to step 74 where it is determined if PTO enable remains on. This, as discussed above, requires that the PTO enable switch be set to on and may, in addition, require certain other conditions be met such as the park brake being set or that the vehicle transmission be in park. If these conditions are not met then PTO enable is not "ON" and the program returns the suspension control module to its default, driving suspension mode. It should be kept in mind that other factors, outside of the scope of the present invention, may have to be dealt with. For example, it is possible that an operator may disengage PTO operation while the aerial lift unit 2 is extended. Programming control may provide for automatic retraction of the unit under these circumstances or not. A customer may not want a vehicle to be driveable without the aerial lift unit 2 being in a fully stowed condition. In such cases a return to driving suspension mode operation should not be taken as indication that a transmission controller (not shown) is enabled to permit putting the vehicle in gear. Such considerations are outside of the scope of the present discussion and specific provisions may depend on customer specifications, e.g. an operator may wish to allow the vehicle to be able to creep forward with the aerial lift unit 2 extended. If PTO enable remains enabled as determined at step 74 then execution advances to step 78. Otherwise the routine is escaped along the execution path to step 76.

Step 78, following a YES indication from decision step 74, confirms PTO operation enablement. The reason for this instruction will be clearer in context of the discussion below. Next, at step 80 it is determined if the aerial lift unit 2 has been moved, as reported by EHCM 32. If not, execution loops back to step 74 to reverify that PTO remains enabled and to confirm PTO operation. This provides an exit from the routine once the aerial lift unit 2 has been stowed and the operator has disabled PTO operation along the program execution route to step 76. If aerial lift unit 2 is determined to have been moved then it is determined if the movement has put the chassis in an out of level condition at step 82. If the chassis is not level, an iterative chassis level operation 84 is performed following along the NO branch from step 82. Successful completion or failure of the iterative chassis leveling operation is determined at step 86. If the chassis cannot be leveled the NO branch from step 86 leads to execution of step 88 which limits operation of the PTO controller EHCM 32 so that the aerial lift unit 2 cannot be moved in certain directions or further extended in a given direction. From step 88 program execution returns to step 80 to detect further movement of the aerial lift unit 2. Along the YES branches from both step 82 and step 86, indicating that the chassis is level, program execution advances to step 90 which releases limits on EHCM 32 if previously applied. The need to allow release of the limits may be required if, for example, in response to limits on operation the operators of the aerial lift unit 2 changed workers in a lift cage to reduce the weight borne by the aerial lift unit. After execution of step 90 program execution loops back to step 74.

The present invention provides the best possible leveling of a vehicle to support aerial lift operation. The very heavy and limited torsion bar system it functionally emulates is no longer required. Ride and drivability of the vehicle are not compromised for the sake of stability of the vehicle as a base for an aerial lift unit. The removal of ballast increases the cargo-carrying payload of the vehicle. The system allows operator implement safety interlocks and stability monitoring that increases the usefulness of the complete unit.

While the invention is shown in only two of its forms, it is not thus limited but is susceptible to various changes and modifications without departing from the spirit and scope of the invention.

What is claimed is:

1. A suspension system for a vehicle providing multiple points of support for a sprung section of the vehicle, the suspension system comprising:
    a plurality of independent, fluidically charged support members with at least a first member being located under the sprung section for each point of support;
    fluid pressure control for each fluidicly charged support member;
    a source of a indication that chassis leveling is to be attempted allowing uneven extension of elements of the suspension system;
    a two-axis horizontal level sensor installed on the sprung section;
    a chassis level controller responsive to the indication that chassis leveling is to be attempted and to the two-axis horizontal level sensor for directing the fluid pressure control to adjust the pressure in at least a first of the plurality of independent, fluidically charged support members to level the sprung section;
    a plurality of suspension extension sensors with one suspension extension sensor being located at each point of support for generating indication of extension or compression of the independent, fluidicly charged support members relative to a norm;
    the chassis level controller being connected to receive the generated indication, the chassis level controller being adapted for bimodal operation including one mode in which the chassis level controller is responsive to the plurality of suspension extension sensors for directing the fluid pressure control to adjust the pressure in the plurality of independent, fluidically charged members to obtain equal extension of the independent, fluidicly charged support members and a second mode in which the pressure in the independent, fluidically charged support members is adjusted to obtain sprung section leveling;
    a power take-off controller installed on the vehicle;
    a communications channel connected between the level controller and the power take-off controller; and
    the level controller being responsive to engagement of the power take-off controller for operating in its second mode for leveling the sprung section of the vehicle and responsive to disengagement of the power take-off controller for operating in its first mode for providing equalizing of extension of the independent, fluidicly charged support members.

2. A suspension system in accord with claim 1, the suspension system further comprising:
    a plurality of actuators under the control of the power take-off controller;
    the power take-off controller being adapted to report operation of the actuators over the communications channel; and
    the level controller being further responsive to receipt of report of operations of the actuators for releveling the sprung section.

3. A suspension system in accord with claim 2, the suspension system further comprising:
    the level controller being responsive in its first mode of operation to the suspension extension sensors to extension or compression of the suspension at any support point to a local limit for limiting operation of the power take-off controller relative to the actuators.

4. A suspension system in accord with claim 3, the suspension system further comprising:
    the level controller being responsive to an attempt to place she power take-off controller into engagement for determining, ab initio, if the sprung section can be leveled in accord with its first mode of operation and if not, for preventing operation of the power take-off controller.

5. A suspension system in accord with claim 4, the suspension system further comprising:
    the actuators being hydraulic actuators; and
    a mobile lift unit installed on the sprung section for positioning by the hydraulic actuators.

6. A suspension system for a vehicle providing multiple points of support for a sprung section of the vehicle, the suspension system comprising:
    a plurality of independent, fluidically charged support members with at least a first member being located under the sprung section for each point of support;
    fluid pressure control for each fluidicly charged support member;
    a two-axis horizontal level sensor installed on the sprung section;
    a chassis level controller responsive to the two-axis horizontal level sensor for directing the fluid pressure control to adjust the pressure in at least a first of the plurality of independent, fluidically charged support members to level the sprung section;
    a plurality of suspension extension sensors with one suspension extension sensor being located at each point of support for generating indication of extension or compression of the independent, fluidicly charged support members relative to a norm;
    the chassis level controller being connected to receive the generated indication, the chassis level controller being adapted for bimodal operation including one mode in which the chassis level controller is responsive to the plurality of suspension extension sensors for directing the fluid pressure control to adjust the pressure in the plurality of independent, fluidically charged members to obtain equal extension of the independent, fluidicly charged support members and a second mode in which the pressure in the independent, fluidicly charged support members is adjusted to obtain sprung section leveling;

a power take-off controller installed on the vehicle;

a communications channel connected between the level controller and the power take-off controller; and the level controller being responsive to engagement of the power take-off controller for operating in its second mode for leveling the sprung section of the vehicle and responsive to disengagement of the power take-off controller for operating in its first mode for Providing epualizing of extension of the independent, fluidicly charged support members.

7. A suspension system in accord with claim 6 the suspension system further comprising:

a plurality of actuators under the control of the power take-off controller;

the power take-off controller being adapted to report operation of the actuators over the communications channel; and the level controller being further responsive to receipt of report of operations of the actuators for releveling the sprung section.

8. A suspension system in accord with claim 7, the suspension system further comprising:

the level controller being responsive in its first mode of operation to the suspension extension sensors to extension or compression of the suspension at any support point to a local limit for limiting operation of the power take-off controller relative to the actuators.

9. A suspension system in accord with claim 8, the suspension system further comprising:

the level controller being responsive to an attempt to place the power take-off controller into engagement for determining, ab initio, if the sprung section can be leveled in accord with its first mode of operation and if not, for preventing operation of the power take-off controller.

10. A suspension system in accord with claim 9, the suspension system further comprising:

the actuators being hydraulic actuators; and a mobile lift unit installed on the sprung section for positioning by the hydraulic actuators.

* * * * *